(12) United States Patent
Liu

(10) Patent No.: US 7,075,245 B2
(45) Date of Patent: Jul. 11, 2006

(54) DRIVING CIRCUIT FOR MULTIPLE COLD CATHODE FLUORESCENT LAMPS BACKLIGHT APPLICATIONS

(75) Inventor: Da Liu, Milpitas, CA (US)

(73) Assignee: 02 Micro, Inc, Santa Clara, CA (US)

( * ) Notice: Subject to any disclaimer, the term of this patent is extended or adjusted under 35 U.S.C. 154(b) by 0 days.

(21) Appl. No.: 10/898,421

(22) Filed: Jul. 22, 2004

(65) Prior Publication Data

US 2004/0263092 A1    Dec. 30, 2004

Related U.S. Application Data

(63) Continuation-in-part of application No. 10/414,374, filed on Apr. 15, 2003, now Pat. No. 6,936,975.

(51) Int. Cl.
H05B 39/04 (2006.01)
H05B 41/24 (2006.01)
H05B 37/02 (2006.01)
H05B 41/36 (2006.01)
G05F 1/00 (2006.01)

(52) U.S. Cl. .................. 315/219; 315/276; 315/291; 315/209 R; 315/224

(58) Field of Classification Search .......... 315/244, 315/276, 247, 209 R, 291, 277
See application file for complete search history.

(56) References Cited

U.S. PATENT DOCUMENTS

| 4,461,980 A | 7/1984 | Nilssen ................ 315/225 |
| 4,535,399 A | 8/1985 | Szepesi ................ 363/20 |
| 4,541,041 A | 9/1985 | Park et al. ............. 363/41 |
| 4,682,082 A * | 7/1987 | MacAskill et al. ....... 315/219 |
| 4,727,469 A | 2/1988 | Kammiller .............. 363/56 |
| 4,763,239 A | 8/1988 | Ball ..................... 363/98 |
| 4,794,506 A | 12/1988 | Hino et al. ............. 363/17 |
| 4,814,962 A | 3/1989 | Magalhes et al. ......... 363/16 |
| 4,833,584 A | 5/1989 | Divan .................. 363/37 |
| 4,855,888 A | 8/1989 | Henze et al. ............ 363/132 |
| 4,860,189 A | 8/1989 | Hitchcock .............. 363/132 |
| 4,864,483 A | 9/1989 | Divan .................. 363/37 |
| 4,912,622 A | 3/1990 | Steigerwald et al. ...... 363/98 |
| 4,935,857 A | 6/1990 | Nguyen et al. .......... 363/17 |
| 4,952,849 A | 8/1990 | Fellows et al. .......... 315/307 |
| 4,953,068 A | 8/1990 | Henze .................. 363/17 |
| 4,992,919 A | 2/1991 | Lee et al. .............. 363/17 |
| 5,012,058 A | 4/1991 | Smith .................. 319/10.55 |
| 5,017,800 A | 5/1991 | Divan .................. 307/66 |
| 5,027,263 A | 6/1991 | Harada et al. ........... 363/16 |
| 5,027,264 A | 6/1991 | Dedoncker et al. ........ 363/16 |
| 5,105,127 A | 4/1992 | Lavaud et al. ........... 315/291 |
| 5,113,334 A | 5/1992 | Tuson et al. ............ 363/25 |
| 5,132,888 A | 7/1992 | Lo et al. ............... 363/17 |

(Continued)

Primary Examiner—Don Wong
Assistant Examiner—Angela M Lie

(57) ABSTRACT

The present invention provides a driving circuit for driving a light source. The driving circuit includes a serial-arranged transformers system having multiple primary windings and secondary windings; a first switch conducting current though a first path and a second switch conducting current though a second path. The first path is a first set of primary windings connected in series and the second path is a second set of primary windings connected in series and the first set of primary transformer windings and the second set of primary transformer windings form the dual primary windings of the transformers respectively. Based on the conduction of each switch, a DC voltage source supplies power to the primary windings of the transformers, which in turn powers on the light source connected to the secondary windings of the transformers.

34 Claims, 13 Drawing Sheets

U.S. PATENT DOCUMENTS

| | | | |
|---|---|---|---|
| 5,132,889 A | 7/1992 | Hitchcock et al. | 363/17 |
| 5,157,592 A | 10/1992 | Walters | 363/17 |
| 5,198,969 A | 3/1993 | Redl et al. | 363/17 |
| 5,208,740 A | 5/1993 | Ehsani | 363/124 |
| 5,231,563 A | 7/1993 | Jitaru | 363/98 |
| 5,235,501 A | 8/1993 | Stuart et al. | 363/17 |
| 5,268,830 A | 12/1993 | Loftus, Jr. | 363/17 |
| 5,285,372 A | 2/1994 | Huynh et al. | 363/132 |
| 5,291,382 A | 3/1994 | Cohen | 363/16 |
| 5,305,191 A | 4/1994 | Loftus, Jr. | 363/17 |
| 5,363,020 A | 11/1994 | Chen et al. | 315/209 |
| 5,384,516 A | 1/1995 | Kawabata et al. | 315/160 |
| 5,402,329 A | 3/1995 | Wittenbreder, Jr. | 363/16 |
| 5,412,557 A | 5/1995 | Lauw | 363/37 |
| 5,418,703 A | 5/1995 | Hitchcock et al. | 363/17 |
| 5,420,779 A | 5/1995 | Payne | 363/56 |
| 5,422,546 A | 6/1995 | Nilssen | 315/219 |
| 5,430,632 A | 7/1995 | Meszlenyi | 363/17 |
| 5,430,641 A | 7/1995 | Kates | 363/133 |
| 5,448,155 A | 9/1995 | Jutras | 323/285 |
| 5,448,467 A | 9/1995 | Ferreira | 363/17 |
| 5,481,160 A | 1/1996 | Nilssen | 315/209 |
| 5,510,974 A | 4/1996 | Gu et al. | 363/134 |
| 5,514,921 A | 5/1996 | Steigerwald | 307/125 |
| 5,546,300 A | 8/1996 | Lee et al. | 363/132 |
| 5,557,176 A * | 9/1996 | O'Brien | 315/307 |
| 5,559,688 A | 9/1996 | Pringle | 363/89 |
| 5,615,093 A | 3/1997 | Nalbant | 363/25 |
| 5,619,402 A | 4/1997 | Liu | 363/20 |
| 5,638,260 A | 6/1997 | Bees | 363/17 |
| 5,646,836 A | 7/1997 | Sadarnac et al. | 363/98 |
| 5,669,238 A | 9/1997 | Devers | 62/657 |
| 5,684,683 A | 11/1997 | Divan et al. | 33/65 |
| 5,694,007 A | 12/1997 | Chen | 315/247 |
| 5,712,533 A | 1/1998 | Corti | 315/169 |
| 5,715,155 A | 2/1998 | Shanani et al. | 363/132 |
| 5,719,474 A | 2/1998 | Vitello | 315/307 |
| 5,719,759 A | 2/1998 | Wagner et al. | 363/132 |
| 5,731,652 A | 3/1998 | Shimada | 310/316 |
| 5,736,842 A | 4/1998 | Jovanovic | 323/222 |
| 5,742,495 A | 4/1998 | Barone | 363/65 |
| 5,742,496 A | 4/1998 | Tsutsumi | 363/95 |
| 5,744,915 A | 4/1998 | Nilssen | 315/209 |
| 5,748,457 A | 5/1998 | Poon et al. | 363/16 |
| 5,764,494 A | 6/1998 | Schutten et al. | 363/17 |
| 5,774,346 A | 6/1998 | Poon et al. | 363/17 |
| 5,781,418 A | 7/1998 | Chang et al. | 363/16 |
| 5,781,419 A | 7/1998 | Kutkut et al. | 363/17 |
| 5,784,266 A | 7/1998 | Chen | 363/16 |
| 5,796,598 A | 8/1998 | Nowak et al. | 363/37 |
| 5,818,172 A | 10/1998 | Lee | 315/86 |
| 5,822,201 A * | 10/1998 | Kijima | 363/25 |
| 5,834,889 A | 11/1998 | Ge | 313/493 |
| 5,844,540 A | 12/1998 | Terasaki | 345/102 |
| 5,854,617 A | 12/1998 | Lee et al. | 345/102 |
| 5,856,916 A | 1/1999 | Bonnet | 363/20 |
| 5,874,809 A * | 2/1999 | Hagen | 315/224 |
| 5,875,103 A | 2/1999 | Bhagwat et al. | 363/17 |
| 5,880,940 A | 3/1999 | Poon | 363/20 |
| 5,886,477 A | 3/1999 | Honbo et al. | 315/209 |
| 5,886,884 A | 3/1999 | Baek et al. | 363/48 |
| 5,910,709 A | 6/1999 | Stevanovic et al. | 315/225 |
| 5,917,722 A | 6/1999 | Singh | 363/132 |
| 5,923,129 A | 7/1999 | Henry | 315/307 |
| 5,930,121 A | 7/1999 | Henry | 363/16 |
| 5,932,976 A | 8/1999 | Maheshwari et al. | 315/291 |
| 5,939,830 A | 8/1999 | Praiswater | 315/291 |
| 5,946,200 A | 8/1999 | Kim et al. | 363/17 |
| 6,011,360 A | 1/2000 | Gradzki et al. | 315/244 |
| 6,051,940 A | 4/2000 | Arun | 315/307 |
| 6,091,206 A * | 7/2000 | Siao | 315/219 |
| 6,114,814 A | 9/2000 | Shannon et al. | 315/219 |
| 6,151,232 A | 11/2000 | Furuhashi et al. | 363/97 |
| 6,259,615 B1 | 7/2001 | Lin | 363/98 |
| 6,396,722 B1 | 5/2002 | Lin | 363/98 |
| 6,501,234 B1 | 12/2002 | Lin et al. | 315/307 |
| 6,559,606 B1 | 5/2003 | Chou et al. | 315/194 |
| 6,568,774 B1 * | 5/2003 | Hitzschke et al. | 315/246 |
| 2002/0047619 A1 * | 4/2002 | Oura et al. | 315/276 |
| 2002/0057584 A1 * | 5/2002 | Brockmann | 363/98 |
| 2004/0017163 A1 * | 1/2004 | Hsu | 315/224 |
| 2004/0066149 A1 * | 4/2004 | Gray | 315/244 |
| 2004/0155601 A1 * | 8/2004 | Chou et al. | 315/291 |
| 2004/0207339 A1 * | 10/2004 | Lin et al. | 315/291 |

* cited by examiner

DRIVING CIRCUIT FOR MULTIPLE COLD CATHODE FLUORESCENT LAMPS BACKLIGHT APPLICATIONS

CROSS REFERENCE TO RELATED APPLICATION

The subject application is a continuation-in-part application of U.S. patent application Ser. No. 10/414,374, entitled "Power Supply for An LCD PANEL," filed on Apr. 15, 2003, now U.S. Pat. No. 6,936,975 published on Aug. 30, 2005 the teachings of which are incorporated herein by reference.

FIELD OF THE INVENTION

The present invention relates to a driving circuit, and more specifically, to a circuit for driving light sources.

BACKGROUND OF THE INVENTION

Both the LCD monitor and LCD TV apparatus use the cold cathode fluorescent lamp as a backlight because this lamp has the best illumination efficiency. Therefore, large-size LCD panels usually contain multiple cold cathode fluorescent lamps. There are various methods of implementing a DC/AC inverter to drive the multiple cold cathode fluorescent lamps. Topologies such as half-bridge, full-bridge, and push-pull circuits are examples.

FIG. 1 shows a schematic drawing of a conventional center-tap primary windings push-pull topology used to drive cold cathode fluorescent lamps in accordance with the prior art. DC power 110 provides DC power to the push-pull circuit. DC power 110 is connected to the primary windings 810–814 of the transformers 310–314 which are connected in parallel. Each secondary winding 710–714 of the transformers 310–314 is coupled to a cold cathode fluorescent lamp circuit 410–414. There is a center-tap on each primary winding 810–814. Two power switches 212 and 214 are coupled to each primary winding 810–814. However, conventional push-pull circuit is limited due to undesired voltage spikes which are caused by the leakage-inductance energy of the transformer at the power switches when they are turned off. In addition, for a high-voltage application, the transformer primary winding needs more turns than those in battery-input applications, which will increase the size and the cost of the transformer. And the transformer winding ratio of FIG. 1 is:

$$\text{Ratio} \approx V_{OUTrms}/V_{IN} \qquad (1)$$

Where $V_{OUTrms}$ is the maximum output voltage and $V_{IN}$ is the minimum input voltage of the transformer. The voltage spike across the switch is usually suppressed by a snubbed circuit to absorb the leakage energy. This passive implementation reduces the power conversion efficiency and increases the system cost with additional parts.

FIG. 2 shows another schematic drawing of a conventional half-bridge topology used to drive cold cathode fluorescent lamps in accordance with the prior art. DC power 110 provides DC power to the half-bridge circuit. Two switches 212 and 214 are coupled to each primary winding 810–814 of the transformers 310–314. Each secondary winding 710–714 of the transformers 310–314 is coupled to a cold cathode fluorescent lamp circuit 410–414. However, for the bridge-type (either half-bridge or full-bridge) circuitry, a level shifter circuit and a high-side driver is needed for the power transistor connected to the input voltage source. For high-voltage applications, this will increase the circuit cost significantly and suffers reliability of switching high-voltage signals.

SUMMARY OF THE INVENTION

A driving circuit for driving a light is disclosed. The driving circuit includes a transformer which has multiple primary windings and a secondary winding. A first switch conducts current though a first set of primary windings connected in series. A second switch conducts current though a second set of primary windings connected in series. The first set of primary transformer windings and the second set of primary transformer windings form dual primary windings of the transformer.

BRIEF DESCRIPTION OF THE DRAWINGS

The foregoing aspects and many of the attendant advantages of this invention will become more readily appreciated and better understood by referencing the following detailed description, when taken in conjunction with the accompanying drawings, wherein.

DETAILED DESCRIPTION

Typically, there are multiple CCFLs in LCDTV applications to provide sufficient brightness on the LCD screen, for example, 4 to 32 CCFLs depending on the size of the LCD panel. In one aspect of the present invention the primary winding of the transformers are coupled in series in the power conversion process.

Figure 1:
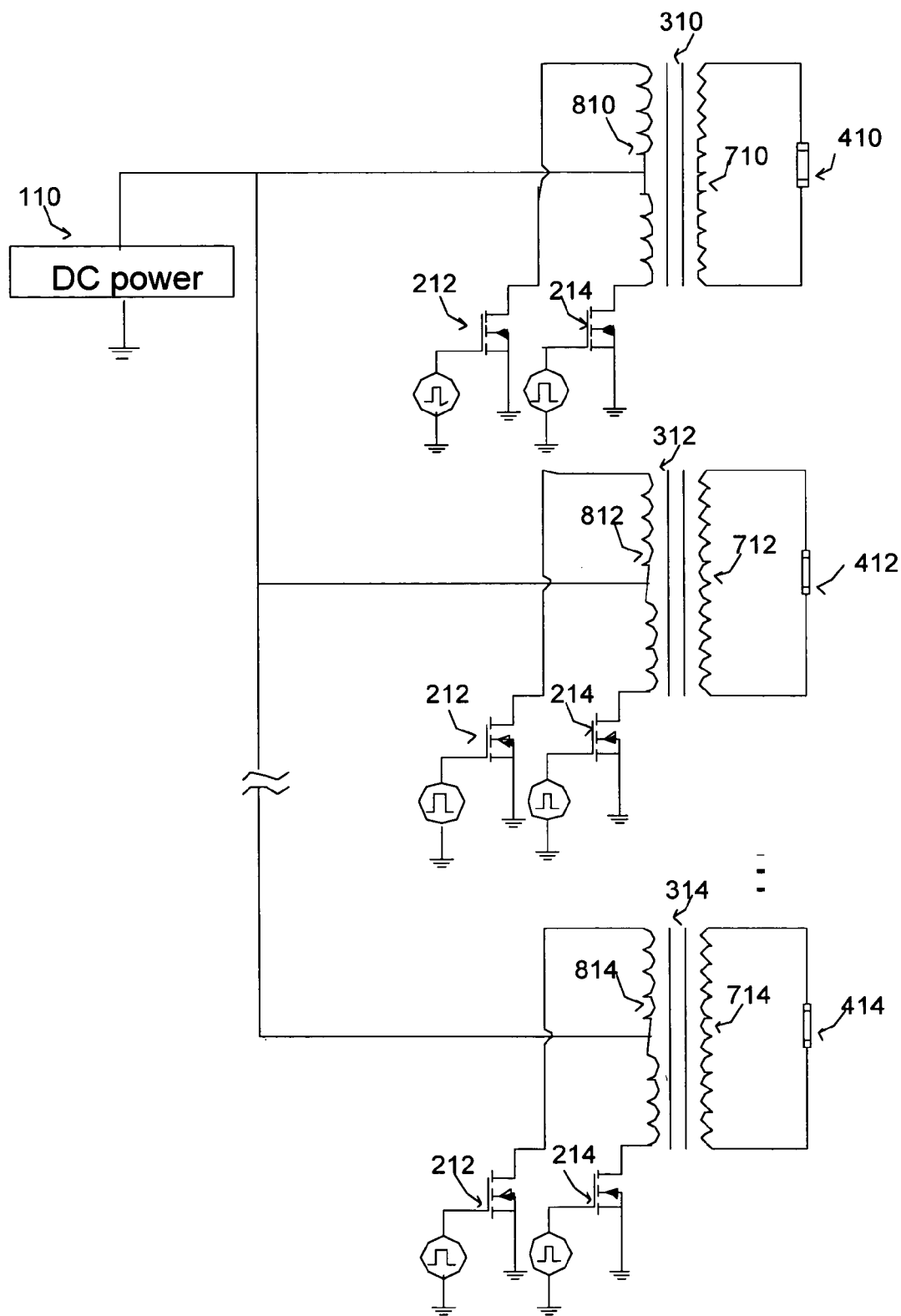
FIG. 1 is a circuit diagram of a conventional center-tap primary windings push-pull driving system in accordance with the prior art.
Figure 2:
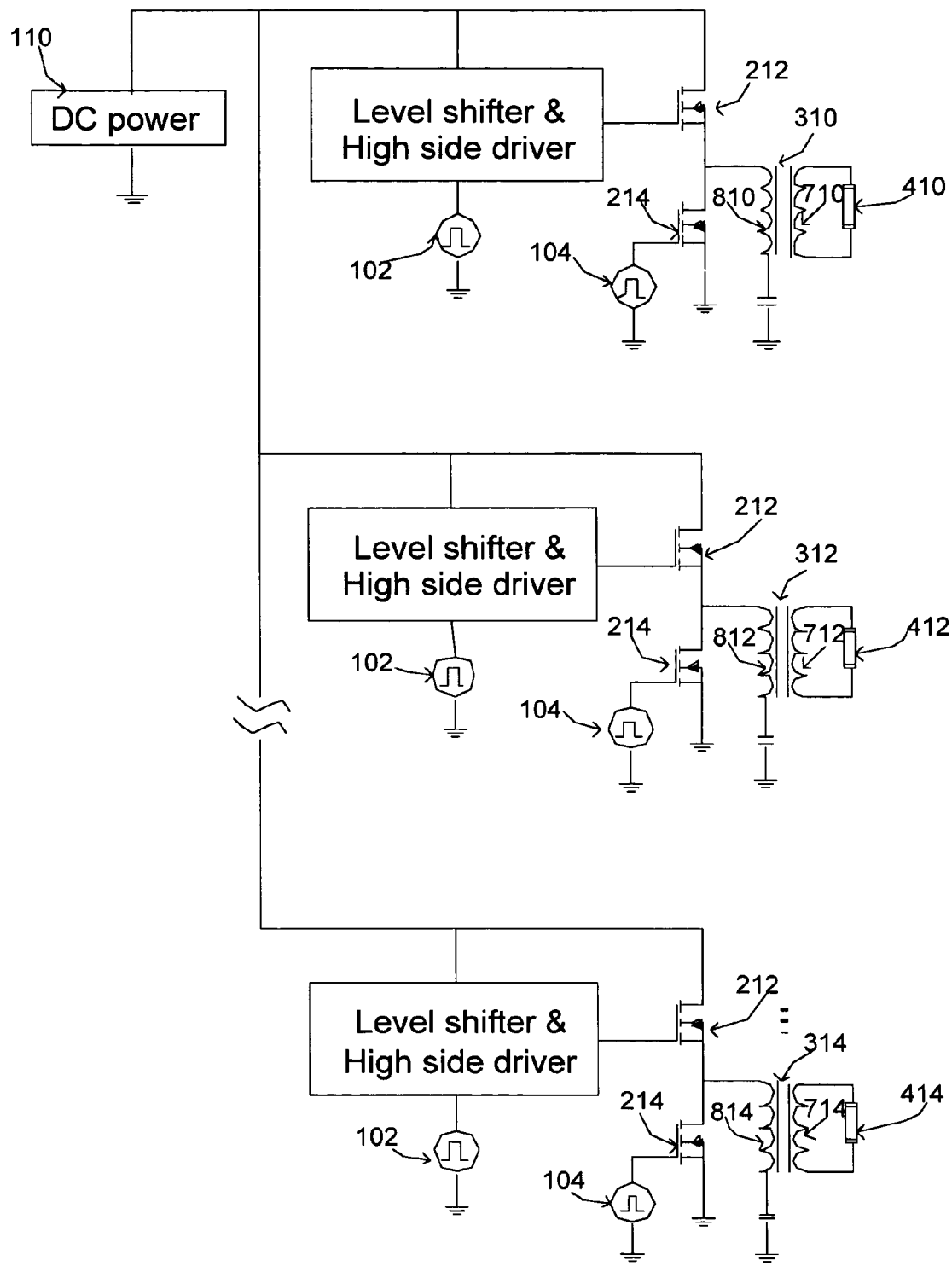
FIG. 2 is another circuit diagram of a conventional half-bridge driving system in accordance with the prior art.
Figure 3A:
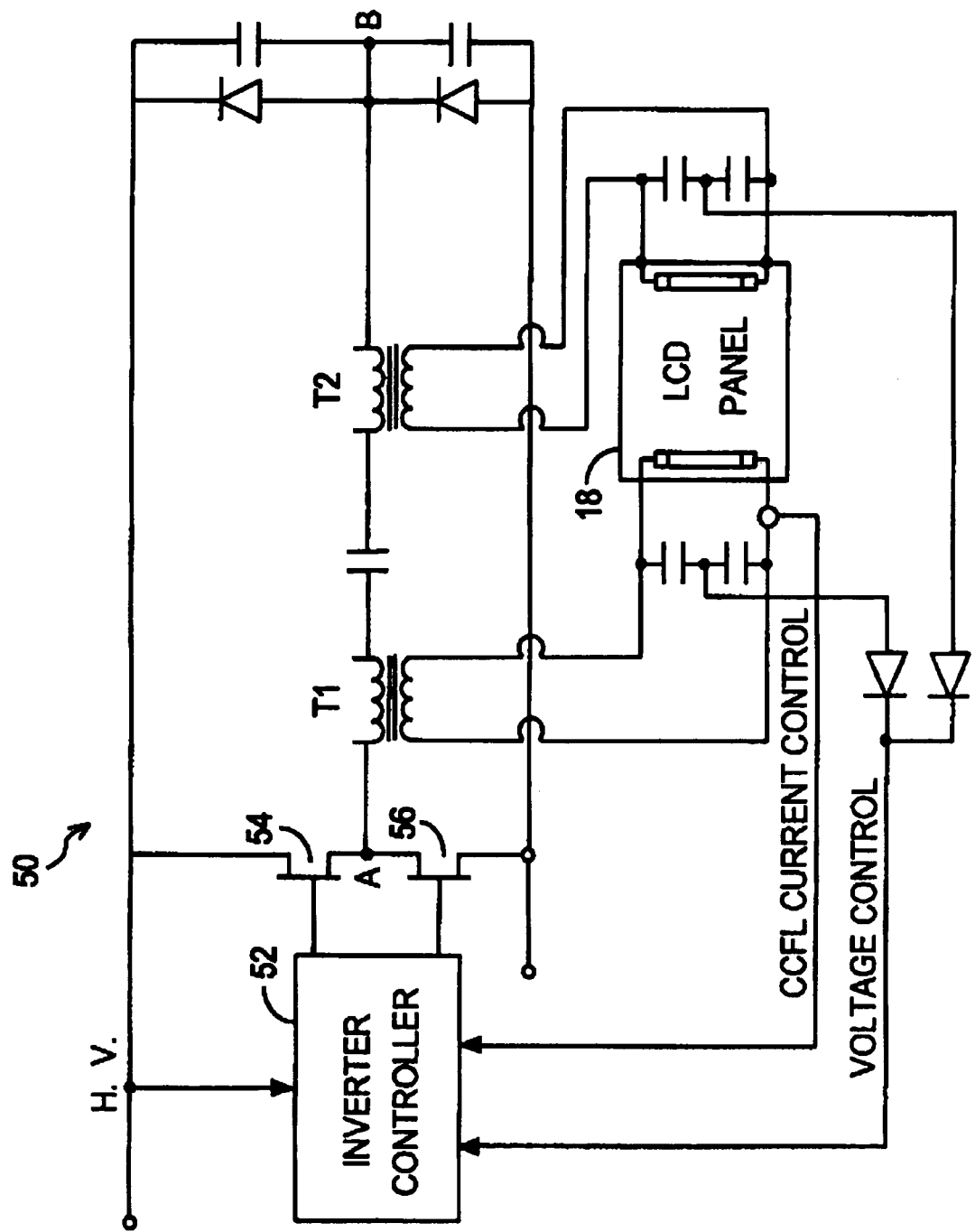
FIG. 3A is an inverter topology for an LCD panel according to one exemplary embodiment of the present invention.

FIG. 3A is an inverter topology 50 for an LCD panel according to one exemplary embodiment of the present invention. In this exemplary embodiment, each primary side of the transformers T1 and T2 is connected in series. Therefore, each primary side sees half of the input voltage across the winding. In half-bridge applications as depicted in FIG. 3A, placing the primary side of the transformers in series reduces to one-fourth of the input voltage across each winding, and the voltage stress reduced to 1/(2N) of the input voltage when applied to a half-bridge application (where N is the number of transformers coupled in series).

Figure 3B:
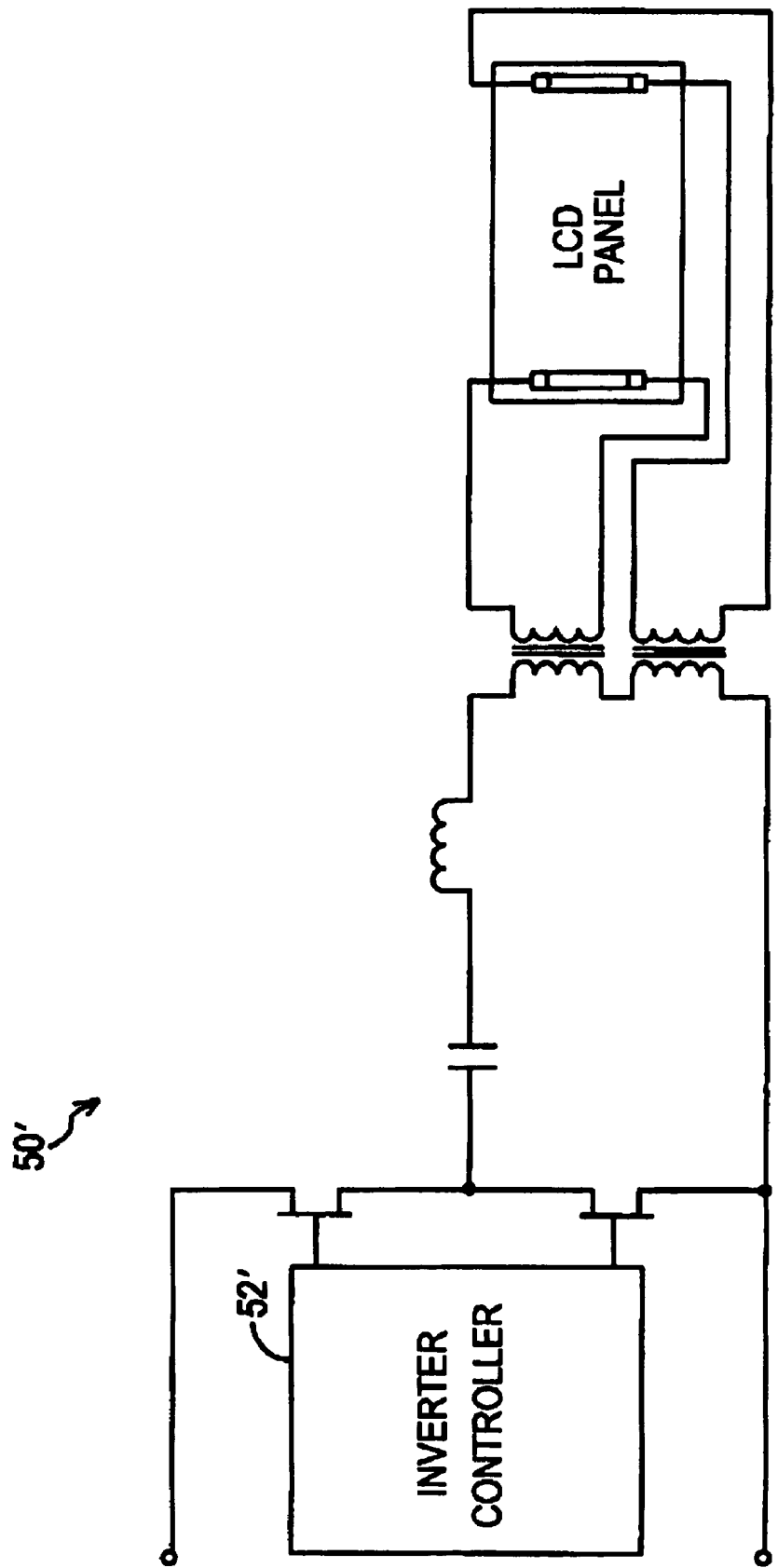
FIG. 3B is an inverter topology for an LCD panel according to another exemplary embodiment of the present invention.

FIG. 3B depicts a class D inverter topology, having similar advantages as set forth above with respect to FIG. 3A since the primary side of the transformers are coupled in series.

Figure 4:
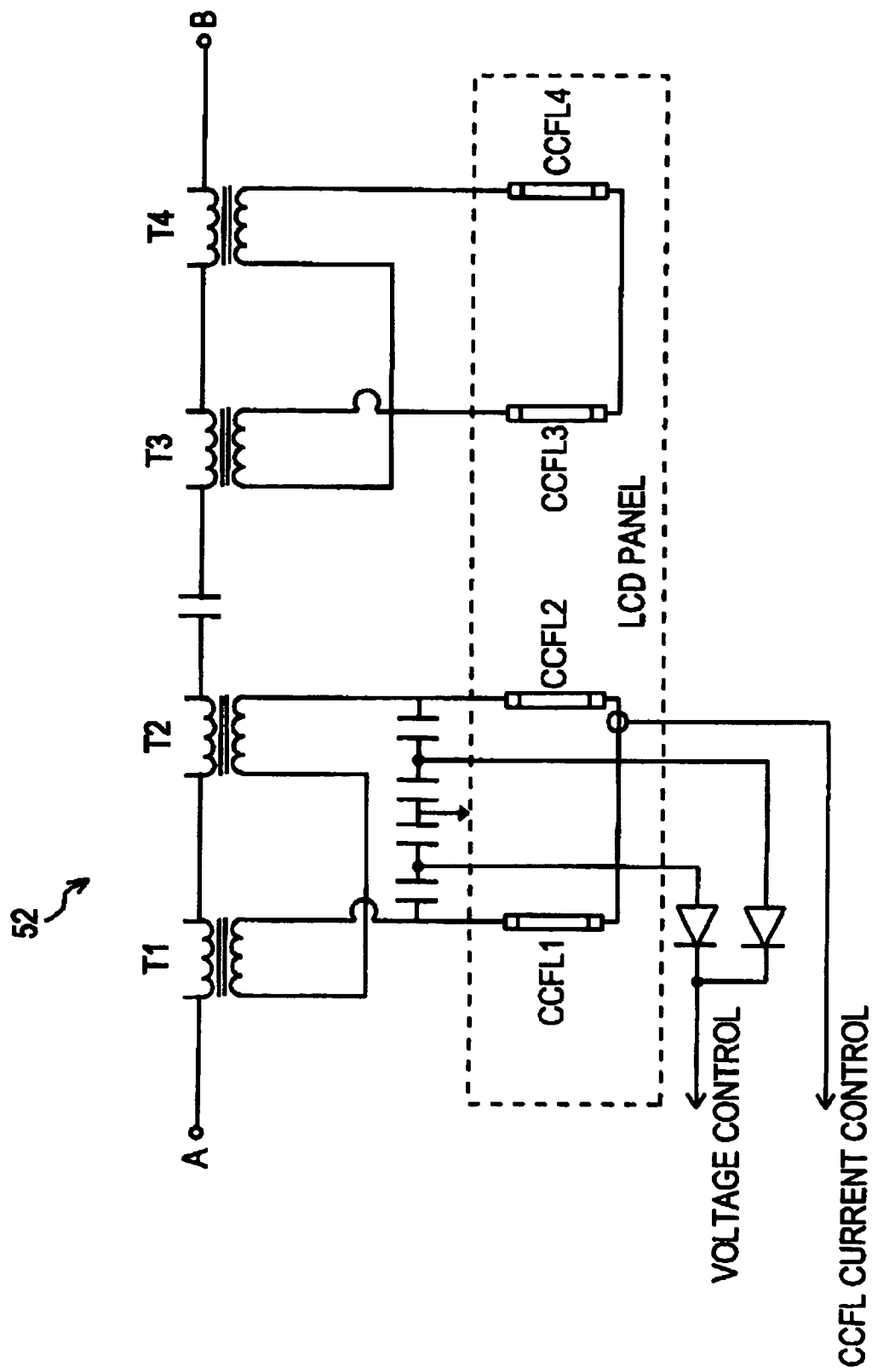
FIG. 4 is a circuit diagram of the transformers and LCD panel of the inverter topology according to the present invention.

FIG. 4 is a circuit diagram 52 of the transformers and LCD panel of the inverter topology according to the present invention. In this figure, the concept is extended to power four CCFL lamps by coupling four primary sides T1, T2, T3, and T4 in series between points A and B of FIG. 3. Likewise, this topology 52' is extended to N lamps in FIG. 5 which depicts N CCFLs powered by N transformers.

Since each of the primary winding is connected in series, the current flowing through each transformer primary side is identical during the turn-on, turn-off of the switched network (i.e., the switches of the half bridge, full bridge or Class D circuits). The switched network is connected to point "A" and "B" in FIGS. 3, 4 and 5. This configuration further improves the current balance in the secondary side of each transformer driving the CCFLs.

Figure 6:
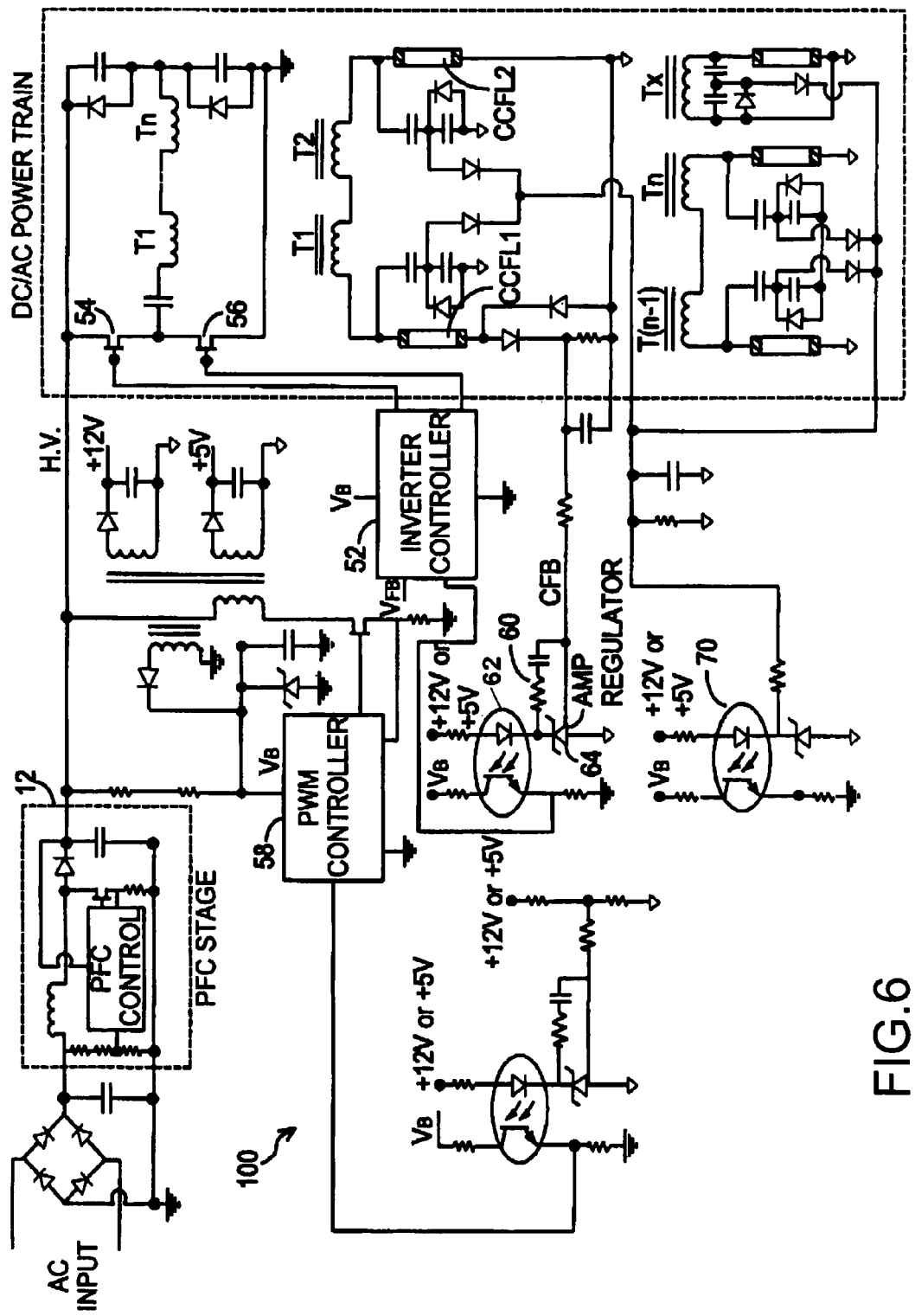
FIG. 6 is a detailed circuit diagram of the LCD power supply system of the present invention.

FIG. 6 depicts a detailed circuit diagram of an exemplary LCD power supply system 100 of the present invention. This power supply includes an inverter controller 52 that drives two switches 54 and 56 in a half bridge circuit, as described in FIG. 3 above. The inverter controller 52 includes voltage and current feedback to control the energy of the CCFLs coupled to the circuit. Each CCFL is driven by a primary side transformer that is coupled in series as shown (i.e., T1, T2 . . . T(n−1), Tn, Tx; where n represents an even number of lamps, and x represents an odd number of lamps) according to the principles and description set forth above.

Current feedback is developed with feedback circuitry 60 which is derived from lamps 1 and 2 in the circuit as shown. The exemplary current feedback circuit 60 includes an opto-coupler 62 and a regulator 64. The regulator amplifies the current feedback signal Cfb and the opto-coupler 62 sends the feedback information to the controller 52. Similarly, voltage feedback information is developed with voltage feedback circuitry 70. In this exemplary embodiment, voltage feedback information is taken from each lamp in the circuit to generate a voltage feedback signal Vb.

The detailed circuit of FIG. 6 also includes other circuitry not directly related to the aspects of the present invention. For example, a PWM controller 58 may be provided to generate DC power supply signals (e.g., 12V and 5V) for other components (e.g., memory, microprocessor, etc.) associated with an LCD display. Likewise, the PFC stage 12 may utilize any conventional and/or custom topology to generate a high voltage DC signal, as described above.

In another aspect, the present invention provides a circuit topology for driving long CCFL tubes. The size of the CCFL tubes in LCDTV applications is usually longer than those in LCD monitor in portable equipment. Driving longer CCFL becomes more difficult. For example, any lamp longer than approximate 60 cm conventional driving methods, a high-frequency and high-voltage (normally in the range of 1000V rms) is applied to the CCFL while one side of the CCFL has a potential near chassis ground. Due to the leakage current path between the CCFL and the chassis, these driving methods usually encounter a darkness effect on one side of the CCFL. Long lamp may mean 75–80 cm or longer, and is generally defined as lamps having a leakage capacitance such that it affects electron migration between the electrodes of the lamp.

Figure 7:
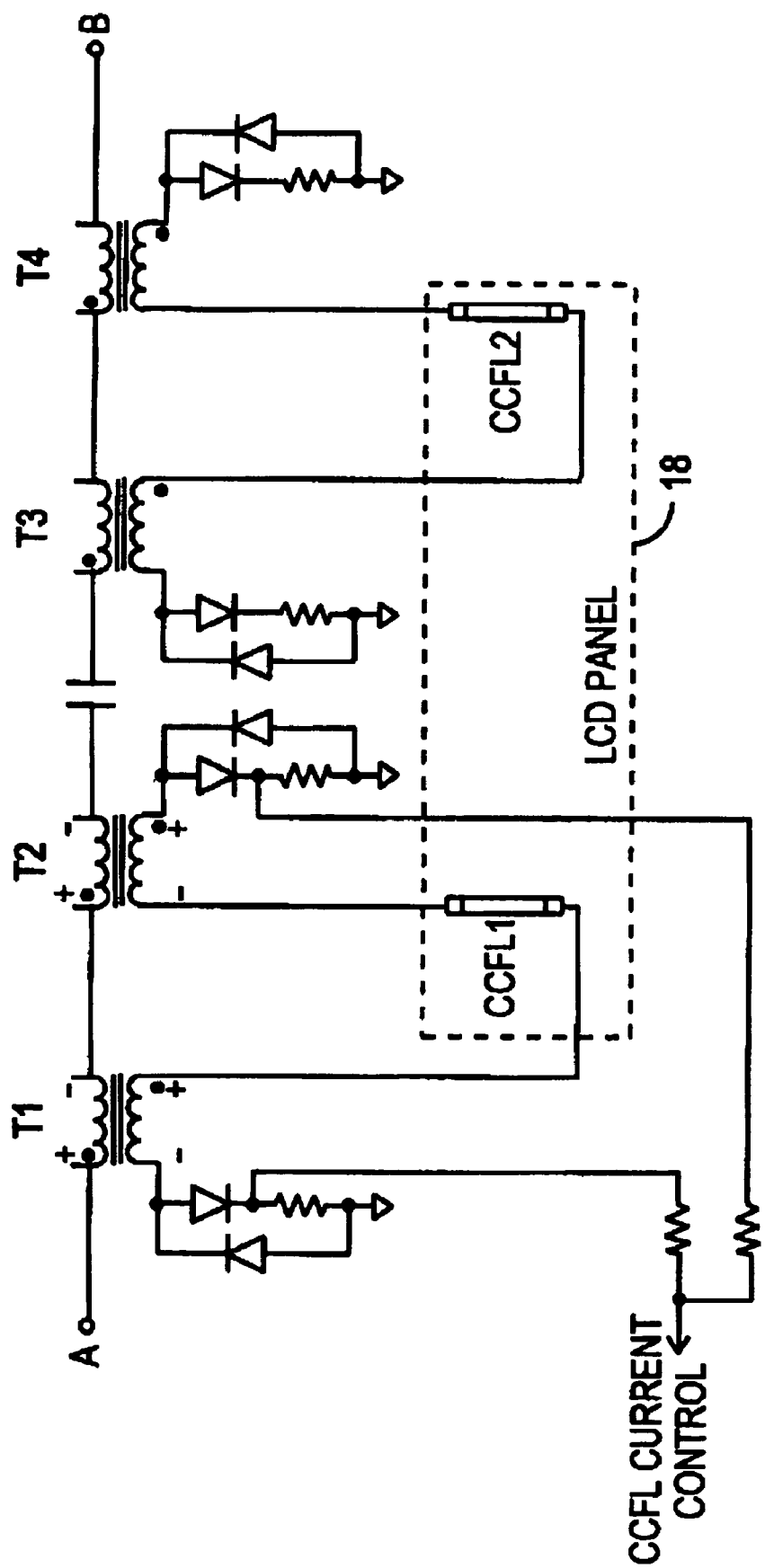
FIG. 7 is another circuit diagram of the transformers and LCD panel of the inverter topology according to the present invention.

To remedy the difficulty, a differential driving technique is provided by the present invention. As illustrated in FIG. 7, a long lamp can be driven with two transformers where the phase polarities of the transformers are opposite. In FIG. 7, CCFL1 is driven by the positive side of the secondary of T1 and the negative side of the secondary of T2 (the positive negative are represented in one half cycle of the sinusoidal power developed by the transformer). The center of CCFL1 is virtually positioned at zero potential. Each transformer delivers, for example 500V rms where the voltage stress and mechanical spacing for safety requirement is lower.

Figure 8:
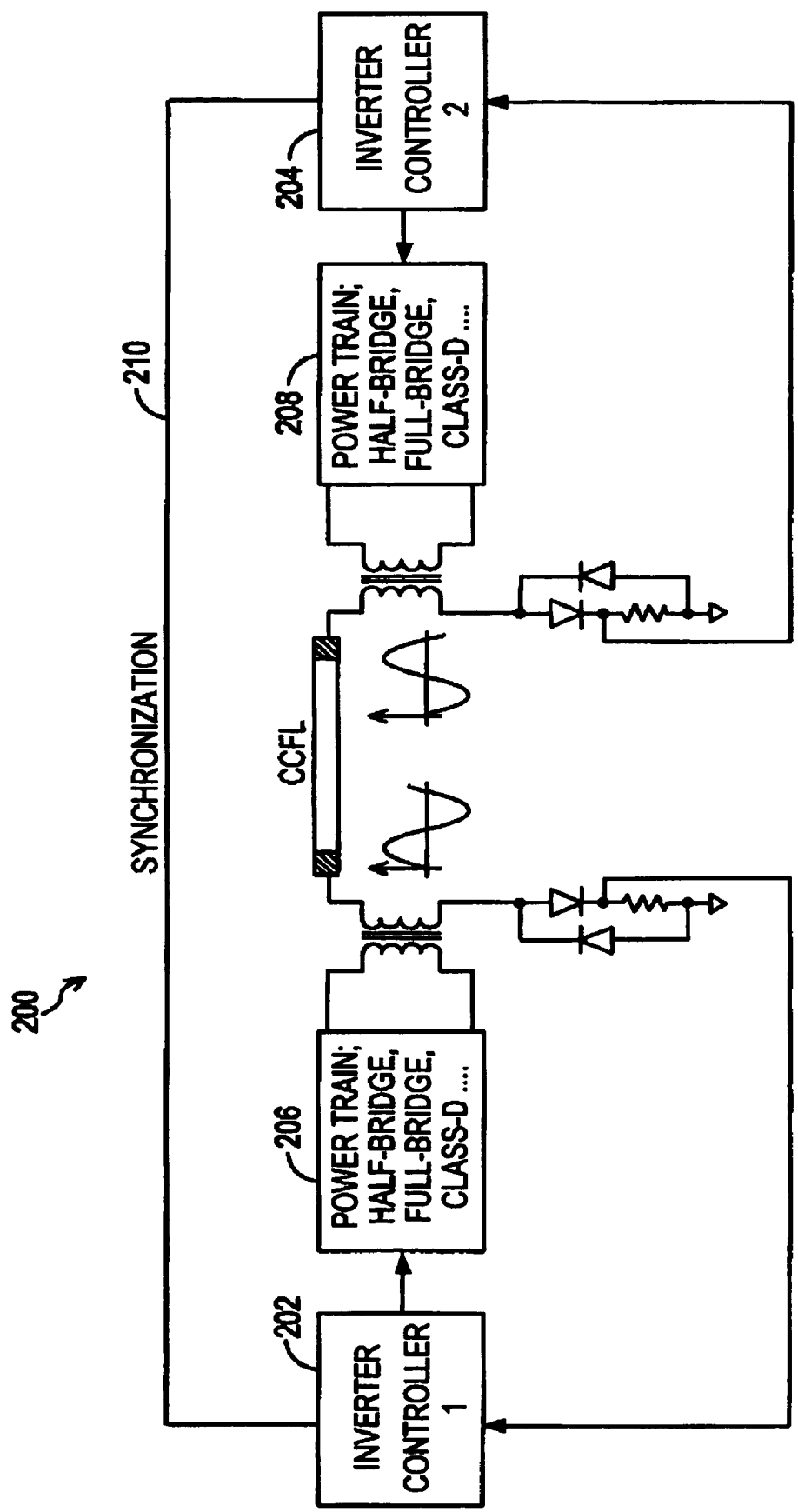
FIG. 8 depicts another driving topology utilizing two controllers and two inverter circuits per CCFL.

In yet another aspect, the driving techniques may be modified as shown in FIG. 8. FIG. 8 depicts a driving topology 200 utilizing two controllers 202 and 204 and two inverter circuits 206 and 208 per CCFL. The inverter circuits are coupled together using synchronization signal 210 so that the controllers control their respective inverter circuits to generate sinusoids that are approximately 180 degrees out of phase, as shown. This ensures that the lamp receives full power from each inverter during each half cycle without cancellation of the power signals. Of course, this topology can include voltage and or current feedback to control the energy delivered to the lamp.

The inverter controllers of the present invention may be conventional inverter controllers which may include dimming circuitry (e.g., burst mode, analog, and/or phase) to adjust the energy delivered to the lamps. Inverter controllers capable of controlling. half bridge, full bridge, Class D and/or other inverter topologies are well known in the art, and all are deemed equivalent to the present invention. For example, U.S. Pat. Nos. 6,259,615 and 5,615,093, hereby incorporated by reference, each disclose inverter controllers for full bridge and half bridge inverter circuits, respectively. The inverter controllers may also be implemented by, for example Part Nos. OZ960, OZ961, OZ965, OZ970, OZ971, OZ972, or OZ9RR, manufactured by O2Micro International Limited.

Figure 5:
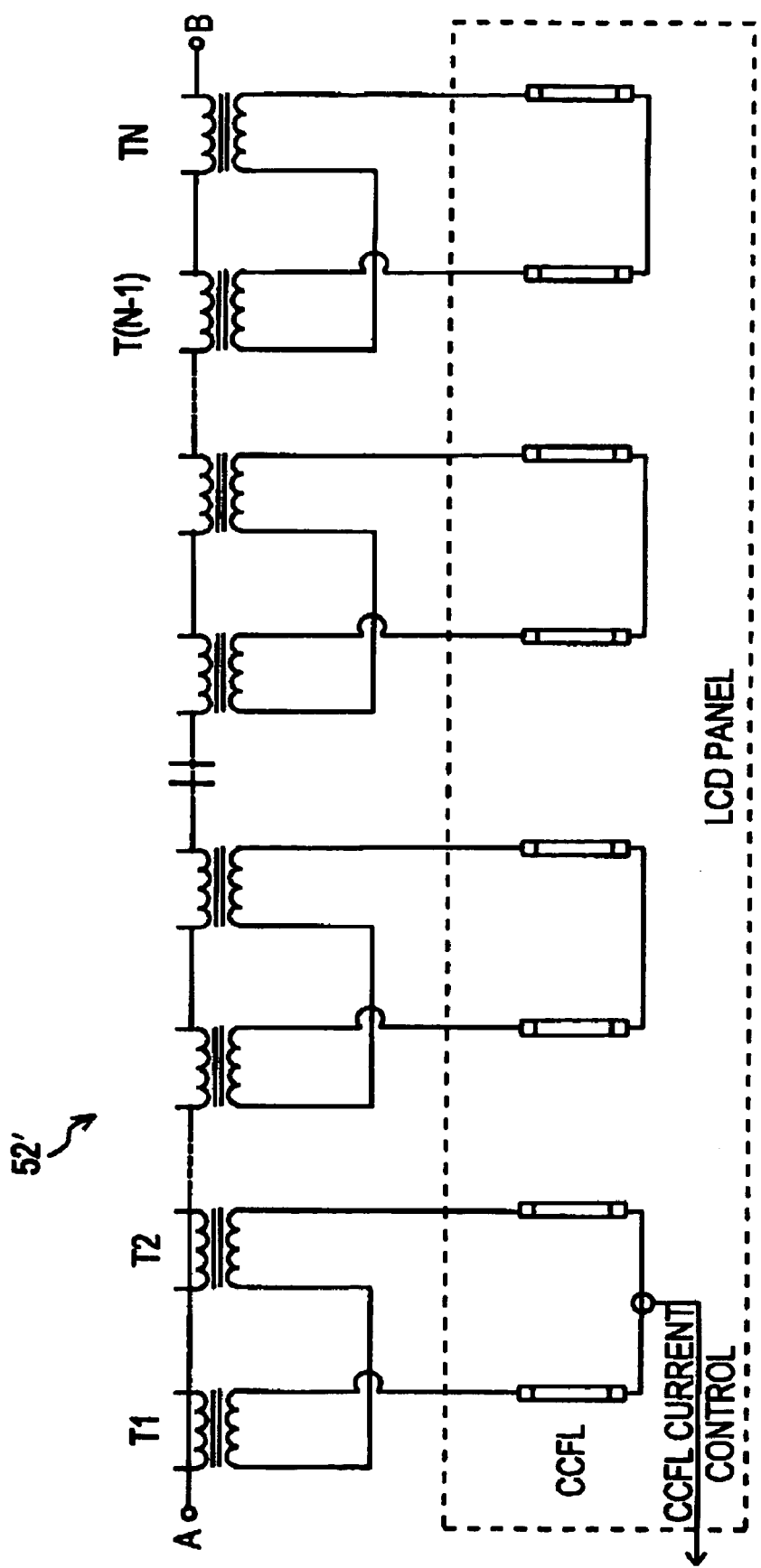
FIG. 5 is another circuit diagram of the transformers and LCD panel of the inverter topology according to the present invention.

Also, the figures depict an LCD panel that includes circuitry to generate a voltage and/or current feedback signal indicative of the voltage and/or current conditions at the lamp load. The inverter controller depicted herein is also adapted to receive this feedback information to adjust the voltage and/or current supplied to the lamp loads. In the exemplary embodiments, current feedback can be generated from a single lamp in the two lamp panel of FIGS. 3A and 3B, or from two lamps in an N lamp panel as shown in FIGS. 4, 5 and 6. In FIG. 7, the current feedback control signals are generated from the portion of the transformer secondary side that is not coupled to the lamp. In this manner, each half cycle of current to the lamp is monitored. Likewise, voltage feedback control signals can be generated in a manner understood in the art.

In the exemplary embodiments, the transformers are coupled to the power supply as controlled by the inverter controller. The inverter controller generates a high voltage AC signal (square wave) from the high voltage DC signal source. In turn, the transformers produce high voltage sinusoidal power from the high voltage AC signal to power the lamps. Of course, the present invention can use a low voltage DC power source, in which case the transformers will be adapted to step up the voltage to an appropriate level to power the lamps. Those skilled in the art will recognize numerous modifications to the present invention, all of which are deemed within the spirit and scope of the present invention only as limited by the claims.

Figure 9:
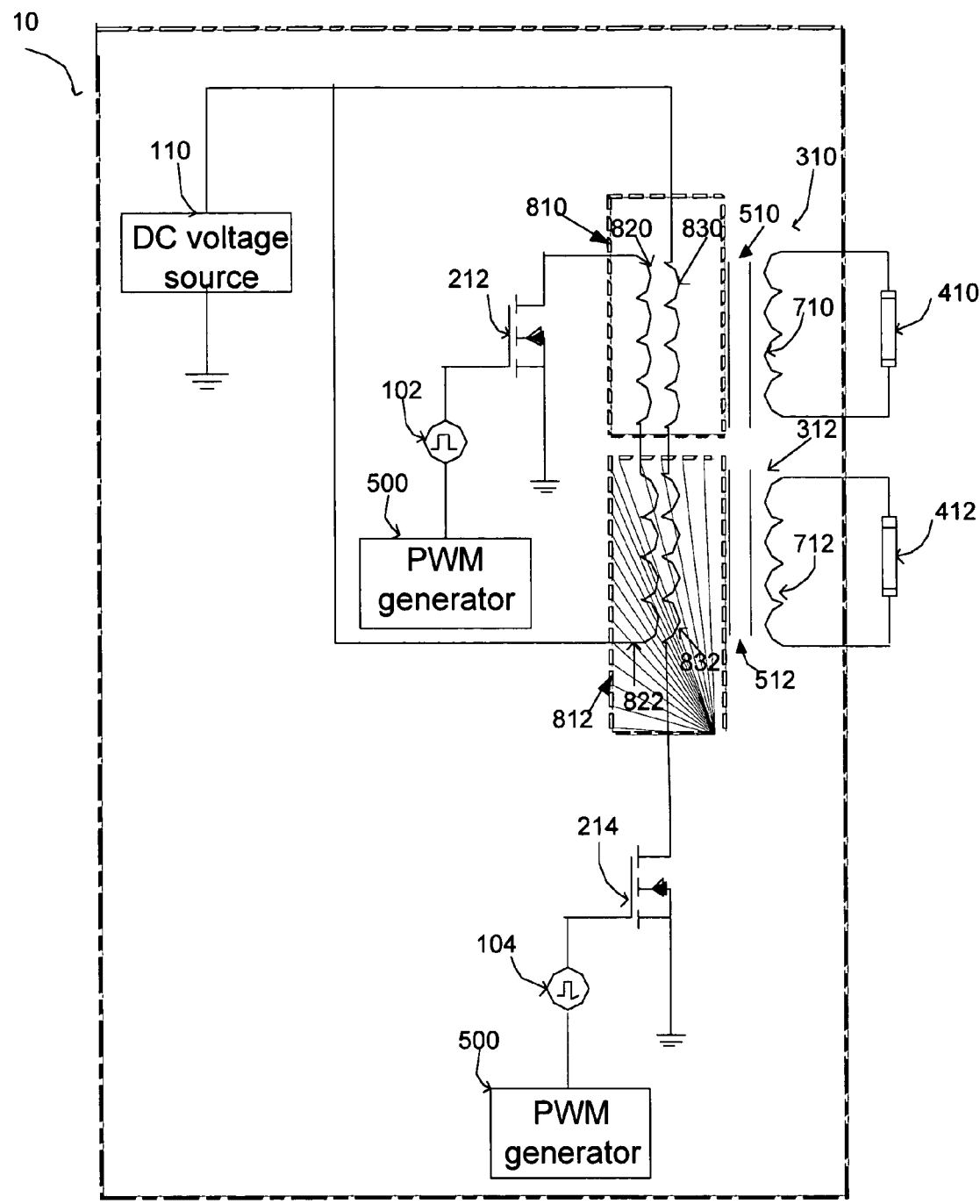
FIG. 9 is a circuit diagram of a push-pull driving system for driving two CCFLs in accordance with the present invention.

Turning to FIG. 9, a circuit diagram of a push-pull driving system 10 in accordance with the present invention is depicted. More specifically, the system 10 is an exemplary driving system for driving two cold cathode fluorescent lamps. The exemplary embodiments will be described herein with reference to cold cathode fluorescent lamps. However, the present invention is applicable to any type of load.

The system 10 generally includes a DC voltage source 110, two power transistors 212 and 214, two transformers 310, 312 and two cold cathode fluorescent lamps 410, 412. DC voltage source 110 can be a DC/DC converter or can be rectified from an AC voltage source. Transformer 310 has a core 510, and a corresponding dual primary winding 810 and a secondary winding 710. Similarly, transformer 312 has a core 512, and a corresponding dual primary winding 812 and a secondary winding 712. One set of the primary windings (820 and 822) are coupled in series and the other set of the primary windings (830 and 832) are coupled in series, which comprise the serial-arranged dual primary windings 810 and 812 respectively, as shown in FIG. 9. Such that transformers 310 and 312 have their dual primary windings 810 and 812 connected in series. And the secondary windings (710 and 712) of both transformers are connected to lamps 410 and 412, respectively. Power switches 212 and 214 described herein are N type MOSFETs. The source of MOSFET 212 is connected to ground, the gate of MOSFET 212 is connected to PWM signal 102 and the drain of MOSFET 212 is connected to the primary winding 820 of transformer 310. Similarly, the source of MOSFET 214 is connected to ground, the gate of MOSFET 214 is connected to PWM signal 104 and the drain of MOSFET 214 is connected to the primary winding 832 of transformer 312. Any other type of power transistor such as bipolar junction transistor, insulated gate bipolar junction transistor and other equivalent transistors can be used as the switch of the present invention. The primary winding voltage can be derived from DC voltage source 110.

Signal 102 and signal 104 are pulse-width modulation signals provided by a pulse-width modulation generator 500. Signal 102 is coupled to MOSFET 212 and signal 104 is coupled to MOSFET 214. PWM signal 102 has a 180 degree phase shift to PWM signal 104. The duty cycles of both PWM signal 102 and PWM signal 104 are less than 50%. MOSFETs 212 and 214 are turned on by the high level of the PWM signal and turned off by the low level of the PWM signal. Because of the 180 degree phase shift between PWM signal 102 and PWM signal 104, MOSFET 212 and MOSFET 214 will be conducted alternately. In operation, when PWM signal 102 is HIGH and PWM signal 104 is LOW, MOSFET 212 will be turned on (ON) while MOSFET 214 will be turned off (OFF). The current is flowing through the first path from DC voltage source 110 to MOSFET 212. Then PWM signal 102 is LOW and PWM signal 104 is HIGH, thus MOSFET 214 is ON and MOSFET 212 is OFF. As a result, the current is flowing through the second path from DC voltage source 110 to MOSFET 214. By alternately conducting MOSFET 212 and MOSFET 214, an AC current will be generated in the dual primary windings 810 and 812 of the transformers 310 and 312. Thus the cold cathode fluorescent lamps connected to the secondary windings 710 and 712 of the transformers 310 and 312 are powered.

The transformer winding ratio of present invention is given by the equation:

$$\text{Ratio} \approx \text{VOUTrms} * N/\text{VIN} \quad (2)$$

Where N is the number of the transformers; VOUTrms is the maximum output voltage and VIN is the minimum input voltage of the transformer. The transformer winding ratio of present invention is ranged from 10 to 100. In the preferred embodiment, there are two transformers. Then equation (2) yields in:

$$\text{Ratio} \approx \text{VOUTrms} * 2/\text{VIN} \quad (3)$$

From equation (1), Ratio increases in proportion to the increase of N. Since Ratio≈Nout/Nin, where Nout is the secondary winding turns and Nin is the primary winding turns of the transformer, thus the primary winding turns is decreased compared to the prior art. Therefore, the leakage inductance of the primary winding is decreased. As a result, the voltage spike caused by the resonance of the leakage inductance and the parasitical capacitance of the power transistor will be reduced.

Figure 10:
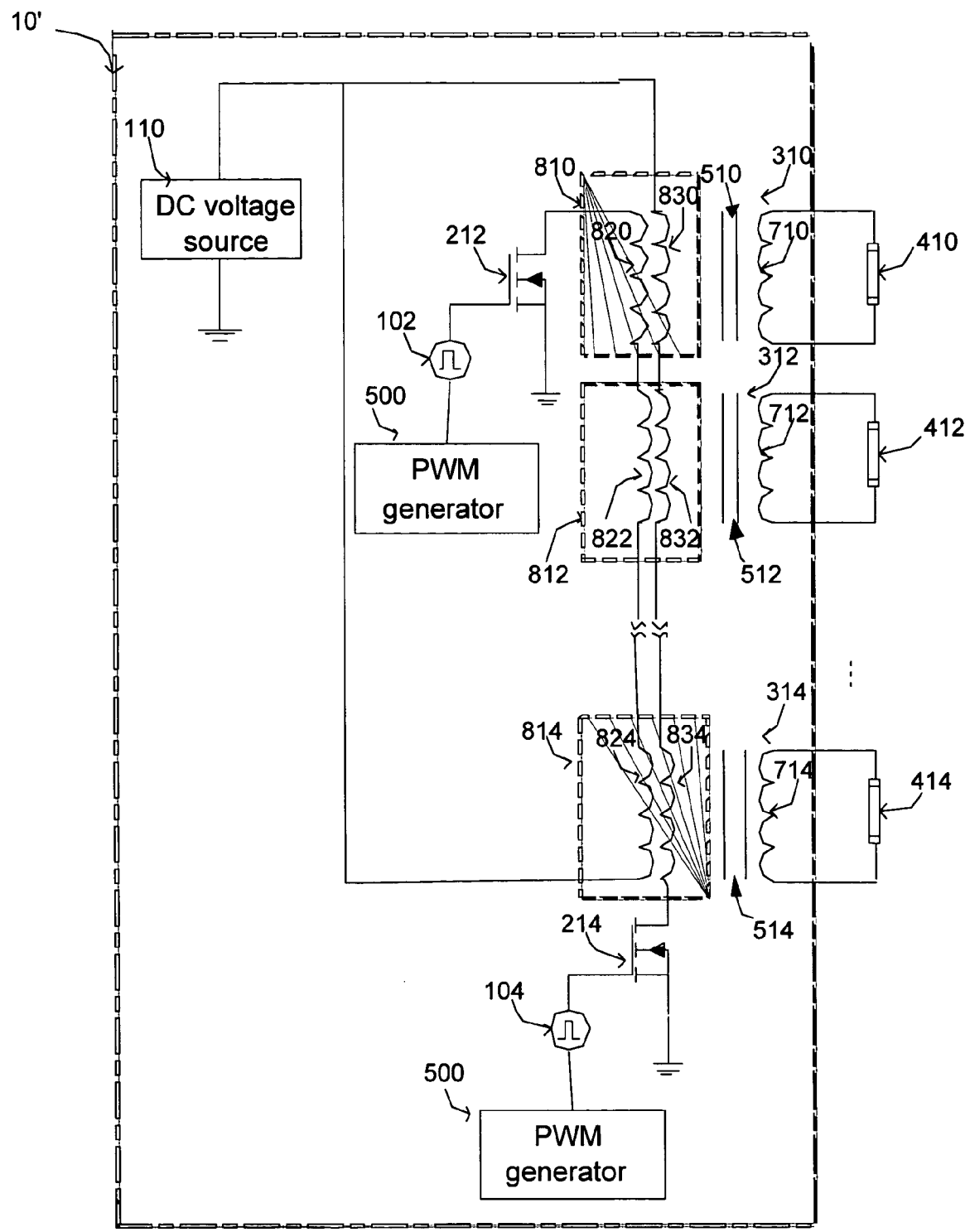
FIG. 10 is a circuit diagram of a push-pull driving system for driving N CCFLs in accordance with the present invention.

The driving topology described above can be extended to multi-lamp environments. FIG. 10 is an exemplary push-pull driving system 10' for driving N cold cathode fluorescent lamps. In an N lamp system, there are N cold cathode fluorescent lamps and respective N secondary windings. As shown in FIG. 10, the first cold cathode fluorescent lamp is labeled as 410, the second cold cathode fluorescent lamp is labeled as 412, and the N cold cathode fluorescent lamp is labeled as 414. Accordingly, N cores 510–514 are provided. One set of the primary windings (820–824) are coupled in series and the other set of the primary windings (830–834) are coupled in series, which comprise the serial-arranged dual primary windings 810–814 respectively. Some components which are similar to those in FIG. 9 are labeled similarly and will not be detailed described herein for clarity. Likewise, the source of MOSFET 212 is connected to ground, the gate of MOSFET 212 is connected to PWM signal 102 and the drain of MOSFET 212 is connected to the primary winding 820 of transformer 310, which has core 510. And the source of MOSFET 214 is connected to ground, the gate of MOSFET 214 is connected to PWM signal 104 and the drain of MOSFET 214 is connected to the primary side 834 of the N transformer 314, which has core 514. The operation of FIG. 10 is similar to that of FIG. 9 and will not be repeatedly described herein. By alternately conducting MOSFET 212 and MOSFET 214, an AC current will be generated in the dual primary windings 810–814 of N transformers 310–314, which have separate cores 510–514 respectively. Therefore N cold cathode fluorescent lamps 410–414 connected to the secondary windings 710–714 of the N transformers 310–314 are illuminated.

In FIG. 9 and FIG. 10, we are discussing multiple cores applications. In FIG. 9, there are two cores 510 and 512, while in FIG. 10 there are N cores 510–514. Alternatively, the present invention can be implemented with a single core. For example, in a single core implementation, with reference to FIG. 9, it also can be a single core with two secondary windings 710 and 712 coupled to CCFL 410 and 412 respectively, and with one set of the primary windings (820 and 830) coupled in series and the other set of primary windings (822 and 832) coupled in series, which comprise the serial-arranged dual primary windings 810 and 812 respectively. All the other elements are the same as those of FIG. 9, except the single core instead of two cores. Similarly, in FIG. 10, N cores 510–514 can be replaced by a single core. In this situation, it can be a single core with N secondary windings 710–714 coupled to N CCFLs 410–412 respectively, and with one set of primary windings (820–824) coupled in series and the other set of primary windings (830–834) coupled in series, which comprise the serial-arranged dual primary windings 810–814 respectively.

Figure 11:
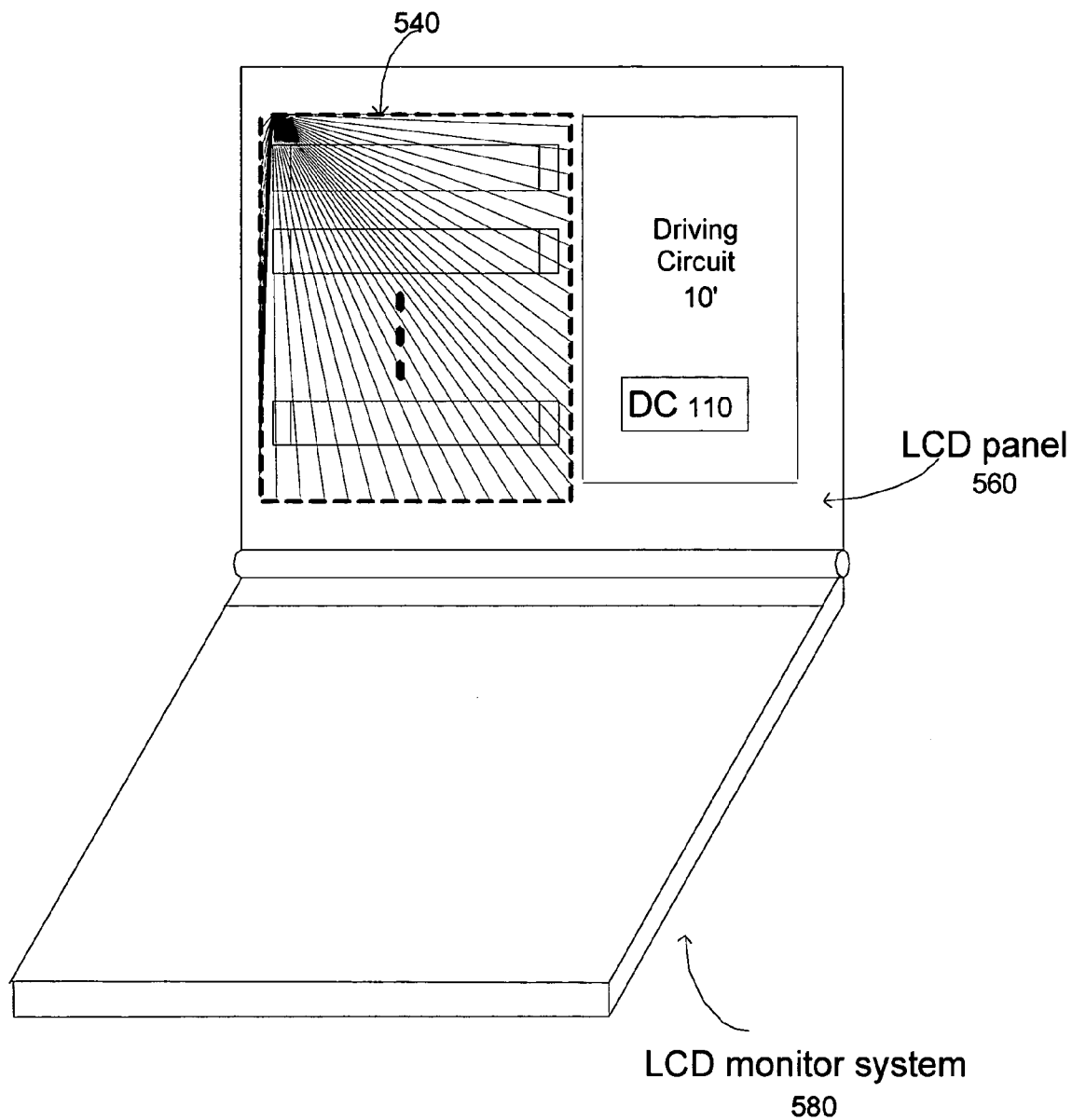
FIG. 11 is a diagram of a block diagram of an examplary display system utilizing the driving circuit of the present invention.

Turning to FIG. 11, it depicts a block diagram of a display system utilizing the driving circuit of the present invention. More specifically, FIG. 11 depicts a LCD panel 560 of LCD monitor system 580 utilizing the driving circuit 10' of the present invention. As a general matter, the LCD panel 560 of the LCD monitor system 580 includes multiple cold cathode fluorescent lamps 540 and driving circuit 10' accordance with the present invention. Once the LCD monitor system 580 powered on, the DC voltage source 110 will deliver power to driving circuit 10'. The detailed operation of the present embodiment is similar to the preferred embodiment of FIG. 9 and FIG. 10, and will not be fully described herein. Thus the cold cathode fluorescent lamps 540 are powered and will provide backlight to the LCD panel 560. The present invention has utility in applications which utilize cold cathode fluorescent lamp technology, for example, display systems found in LCD monitor, LCD TV etc., as described herein; although other utilities are contemplated herein.

Figure 12:
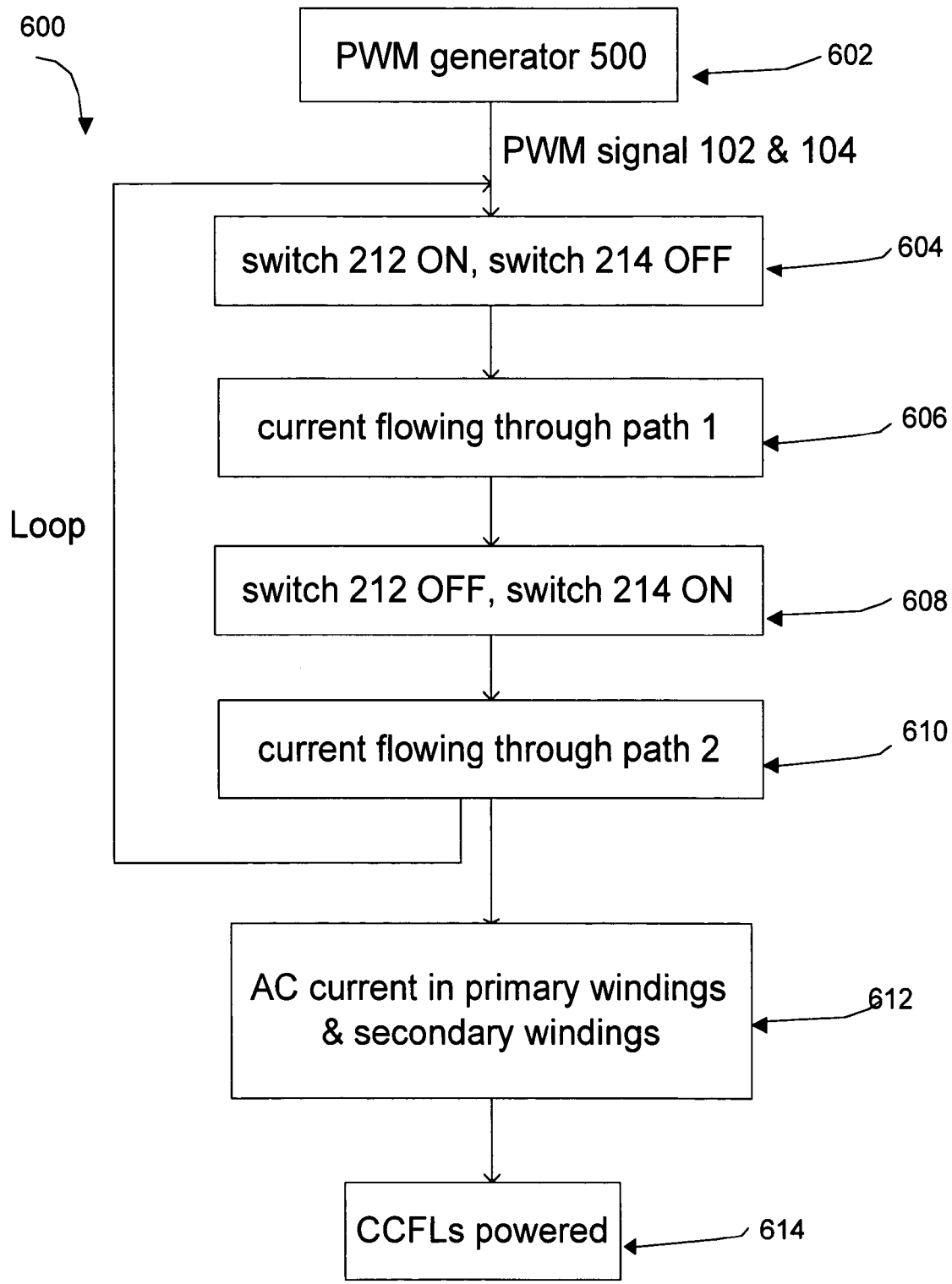
FIG. 12 is a flow chart of a method for driving a light source in accordance with the present invention.

FIG. 12 shows a flow chart 600 of a method for driving a light source in accordance with the present invention. As shown in the figure, in step 602, PWM generator 500 provides PWM signal 102 and 104 to switch 212 and 214 respectively. Assume PWM signal 102 is HIGH and PWM signal 104 is LOW since PWM signal 102 has a 180 degree phase shift to PWM signal 104. Thus in step 604, switch 212 is ON and switch 214 is OFF. So the current is flowing through the first path in step 606. In step 608, PWM signal 102 is LOW and PWM signal 104 is HIGH. Similarly, the current is flowing through the second path in step 610. Then PWM signal 102 is HIGH and PWM signal 104 is LOW again and the above process is repeating. As a result, the current is flowing through the first path and the second path alternately along with the conductance of switch 212 and switch 214 respectively. Therefore, an AC current is generated in the primary windings and the secondary windings in step 612, which in turn powers the cold cathode fluorescent in step 614.

The driving circuit topology of the present invention provides the following advantages. First, this driving circuit needs less primary winding turns compared to prior art. Second, the voltage spike on power switch caused by the resonance of the leakage inductance and the parasitical capacitance of the power transistor is thus reduced. Third, since less primary winding turns are needed, the circuit structure is smaller in size and significant cost savings is achieved in the present invention over prior art techniques. The present invention provides a cost effective and better-performance derived push-pull circuitry for a high-voltage DC/AC backlight inverter applications.

The foregoing descriptions of the preferred embodiment of the present invention are an illustration of the present invention rather than a limitation thereof. It is intended to cover various modifications and similar arrangements included within the spirit and scope of the appended claims. While the preferred embodiments of the invention has been illustrated and described, it will be appreciated that various changes can be made therein without departing from the spirit and scope of the invention.

What is claimed is:

1. A driving circuit for driving a light source comprising:
   a transformer comprising multiple primary windings and a secondary winding, wherein said multiple primary windings are coupled to a power source and said secondary winding is coupled to said light source;
   a first switch for conducting current through a first path comprising a first set of primary windings coupled in series;
   a second switch for conducting current through a second path comprising a second set of primary windings coupled in series, wherein said first set of primary windings and said second set of primary windings comprise said multiple primary windings corresponding to said transformer; and
   a pulse-width modulation generator configured to generate a first pulse-width modulation signal and a second pulse-width modulation signal to said first switch and second switch respectively, wherein said first pulse-width modulation signal has a 180 degree phase shift to said second pulse-width modulation signal.

2. The driving circuit as claimed in claim 1, wherein said driving circuit comprises a plurality of transformers.

3. The driving circuit as claimed in claim 2, wherein said plurality of transformers comprise a plurality of secondary windings.

4. The driving circuit as claimed in claim 3, wherein said multiple primary windings comprise dual primary windings.

5. The driving circuit as claimed in claim 4, wherein said dual primary windings are wound on multiple cores.

6. The driving circuit as claimed in claim 4, wherein said dual primary windings are wound on a single core.

7. The driving circuit as claimed in claim 5, wherein said secondary windings are wound on said multiple cores.

8. The driving circuit as claimed in claim 6, wherein said secondary windings are wound on a single core.

9. The driving circuit as claimed in claim 4, wherein said dual primary winding is coupled to said first switch and said second switch.

10. The driving circuit as claimed in claim 1, wherein the winding ratio of said transformer ranges from 10 to 100.

11. The driving circuit as claimed in claim 1, wherein said first switch is selected from a transistor group comprising metal oxide semiconductor field effect transistor, bipolar junction transistor, and insulated gate bipolar junction transistor.

12. The driving circuit as claimed in claim 1, wherein said second switch is selected from a transistor group comprising of metal oxide semiconductor field effect transistor, bipolar junction transistor, and insulated gate bipolar junction transistor.

13. A method for driving a light source, said method comprising:
   switching a first switch to conduct current through a first path comprising a first set of primary windings coupled in series in a transformer;
   switching a second switch to conduct current through a second path comprising a second set of primary windings coupled in series in said transformer, wherein said first set of primary windings and said second set of primary windings comprise multiple primary windings corresponding to said transformer; and
   using a first pulse-width modulation signal and a second pulse-width modulation signal to switch said first switch and second switch respectively, wherein said first pulse-width modulation signal has a 180 degree phase shift to said second pulse-width modulation signal.

14. The driving circuit as claimed in claim 13, wherein said first set of primary windings and said second set of primary windings comprise multiple primary windings corresponding to a plurality of transformers having a plurality of secondary windings coupled to said light source.

15. The method as claimed in claim 14, wherein said multiple primary windings comprise dual primary windings.

16. The method as claimed in claim 13 further comprises the step of selectively switching said first switch and said second switch alternately.

17. The method as claimed in claim 16, wherein said current flows through said first path to said first switch if said first switch is turned on.

18. The method as claimed in claim 16, wherein said current flows through said second path to said second switch if said second switch is turned on.

19. The method as claimed in claim 15, wherein said dual primary windings are on multiple cores respectively.

20. The method as claimed in claim 15, wherein said dual primary windings are on a single core.

21. The method as claimed in claim 19, wherein said secondary windings are on said multiple cores respectively.

22. The method as claimed in claim 20, said secondary windings are on said single core.

23. The method as claimed in claim 13, wherein said first switch is selected from the transistor group comprising of metal oxide semiconductor field effect transistor, bipolar junction transistor, and insulated gate bipolar junction transistor.

24. The method as claimed in claim 13, wherein said second switch is selected from the transistor group comprising of metal oxide semiconductor field effect transistor, bipolar junction transistor, and insulated gate bipolar junction transistor.

25. A display system, comprising:
a plurality of light sources; and
a driving circuit for driving said plurality of light sources, said driving circuit comprising:
a transformer comprising multiple primary windings and a secondary winding;
a first switch for conducting current through a first path comprising a first set of primary windings coupled in series;
a second switch for conducting current through a second path comprising a second set of primary windings coupled in series, wherein said first set of primary windings and said second set of primary windings comprise said multiple primary windings corresponding to said transformer; and
a pulse-width modulation generator configured to generate a first pulse-width modulation signal and a second pulse-width modulation signal to said first switch and second switch respectively, wherein said first pulse-width modulation signal has a 180 degree phase shift to said second pulse-width modulation signal.

26. The display system as claimed in claim 25, wherein said driving circuit comprises a plurality of transformers.

27. The display system as claimed in claim 26, wherein said plurality of transformers comprise a plurality of secondary windings.

28. The display system as claimed in claim 27, wherein said multiple primary windings comprise dual primary windings.

29. The display system as claimed in claim 28, wherein said dual primary windings are on multiple cores respectively.

30. The display system as claimed in claim 28, wherein said dual primary windings are on a single core.

31. The display system as claimed in claim 29, wherein said secondary windings are on said multiple cores respectively.

32. The display system as claimed in claim 30, wherein said secondary windings are on said single core.

33. The display system as claimed in claim 28, wherein said dual primary winding is coupled to said first switch and said second switch.

34. The display system as claimed in claim 25, wherein the winding ratio of said transformer ranges from 10 to 100.

* * * * *